June 4, 1968  F. HARTMANN  3,386,228
APPARATUS FOR SEPARATING GASEOUS COMPONENTS FROM GAS MIXTURES
Filed Nov. 21, 1966  4 Sheets-Sheet 1

Inventor:
Fortunat Hartmann
BY Pennie, Edmonds,
Morton, Taylor and Adams
ATTORNEYS

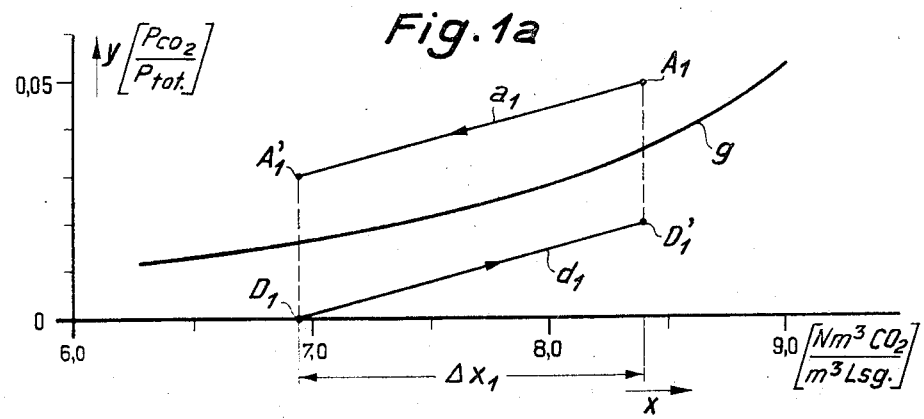
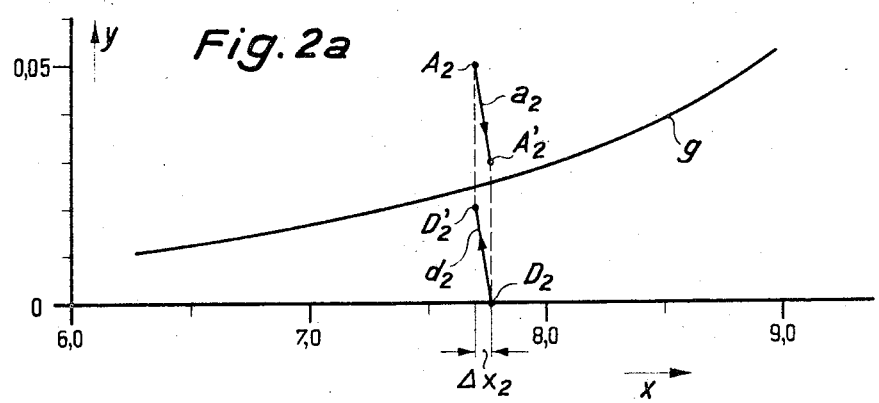
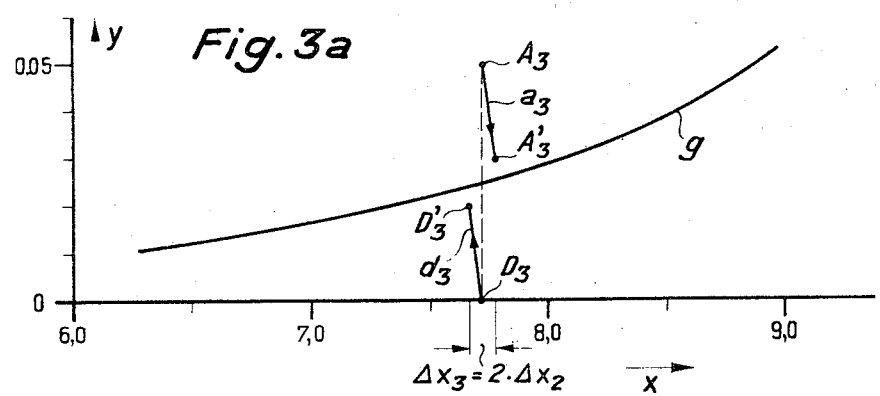

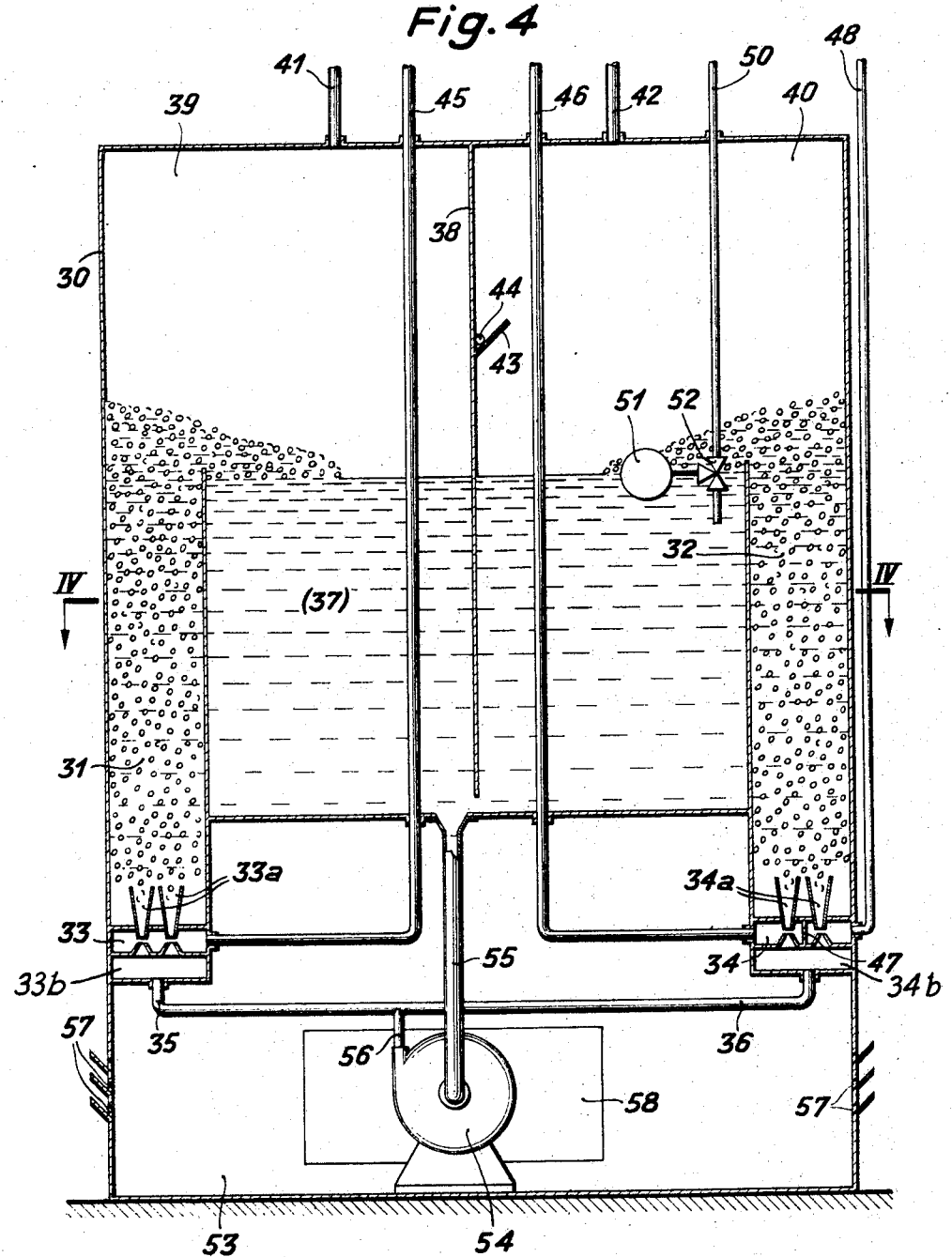

June 4, 1968     F. HARTMANN     3,386,228
APPARATUS FOR SEPARATING GASEOUS COMPONENTS FROM GAS MIXTURES
Filed Nov. 21, 1966     4 Sheets-Sheet 4

Inventor:
Fortunat Hartmann
BY Pennie, Edmonds,
Morton, Taylor and Adams
ATTORNEYS United States Patent Office 3,386,228
Patented June 4, 1968

3,386,228
APPARATUS FOR SEPARATING GASEOUS
COMPONENTS FROM GAS MIXTURES
Fortunat Hartmann, Zurich, Switzerland, assignor to
Sulzer Brothers Limited, Winterthur, Switzerland,
a company of Switzerland
Continuation-in-part of application Ser. No. 419,291,
Dec. 18, 1964. This application Nov. 21, 1966, Ser.
No. 617,729
Claims priority, application Switzerland, Dec. 20, 1963,
15,557/63
5 Claims. (Cl. 55—196)

ABSTRACT OF THE DISCLOSURE

A common reservoir is used for storing a liquid absorbent for gas absorption and stripping operations in which operations the absorbent from the reservoir is withdrawn and separately delivered to two mixing zones, immediately below an absorption column and a stripping column, respectively. The liquid absorbent delivered to both zones is accelerated to a speed sufficient to entrain the gas mixture whose component is to be absorbed into the mixing zone for the absorption column, the stripping gas into the mixing zone for the stripping column. The resultant liquid and gas mixtures are directed to their respective absorption and stripping columns. After separation of the gas and liquid components from the absorption and stripping columns, the liquid components are returned to the reservoir for further use.

Figure 1:
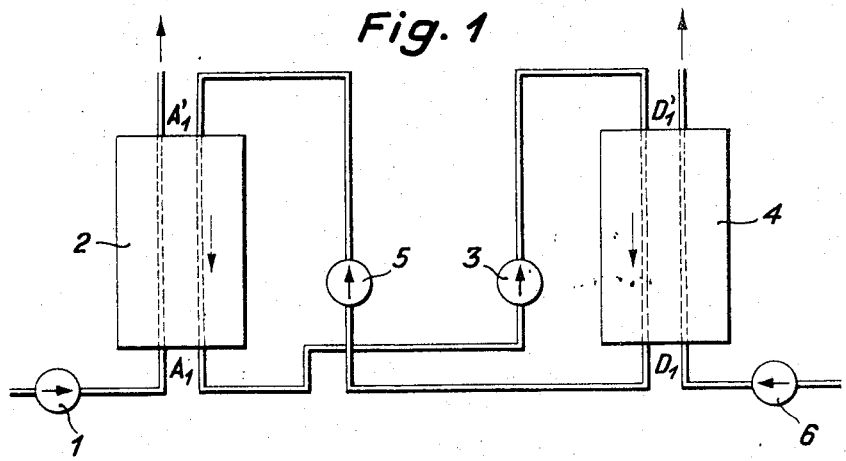

The present application is a continuation-inpart of my application Ser. No. 419,291, filed Dec. 18, 1964, and entitled, Separation of Gaseous Components From Gas Mixtures, now abandoned.

This invention relates to an apparatus for the separation of gas components from gas mixtures using liquid absorbents to absorb the gas components from the gas mixtures in an absorption operation and stripping gases to regenerate the used absorbents in a stripping operation.

Gas absorption and stripping operations are commonly used in the industry to separate the gases and to regenerate the used absorbents. The general practice is to carry out these operations in suitable columns, by feeding, in a counter-current arrangement, the gas and the liquid streams into the columns to effect a mass transfer between the two phases. While counter-current absorber requires comparatively small amount of liquid absorbent per unit volume of gas treated, the total volume of the column required for a given separation is large. Installation of these columns for example, the commonly used packed towers require large plant site and solid foundation. The comparatively high costs of packed towers coupled with the high installation costs contribute substantially to the high initial capital requirement for the gas absorption and stripping plant. Furthermore, the large pressure drops experienced in the packed towers and other similar columns require large pumping capacity which contribute to the overall high operational expenses.

It is, therefore, the principal object of this invention to provide an economic apparatus for the separation of gas components from gas mixtures, particularly for applications where the content of a gas component in a gas mixture is to be reduced by a certain percentage or where the quantity of gas component varies in a gas mixture enclosed in a room or chamber and the content of these gas components is to be kept at a constant value. Advantageously, the process of the invention is to be carried out in a single unit which can be monitored readily during its operation and which requires less space than the known plants.

Broadly stated, the process of this invention for the separation of at least one gas component from a gas mixture uses a liquid absorbent to absorb the gas component in an absorption operation and a stripping gas to remove the absorbed gas component from the used liquid absorbent in a stripping operation. The process steps include maintaing the absorbent in a reservoir, withdrawing the absorbent from the reservoir, dividing and feeding the absorbent under pressure to at least two separate mixing zones. Each of these zones has access to either the source of the gas mixture or the source of the stripping gas. The process continues by accelerating the liquid absorbent through the mixing zones at a speed sufficient to entrain the gas mixture and the stripping gas from their sources and to mix therewith the absorbent in their mixing zones. The resultant liquid and gas mixture in each of these mixing zones is directed to the absorption and the stripping zones, respectively. After they pass through the absorption zone and the stripping zone, the gas and liquid mixture from each of the zones is separated and the liquid absorbent from both zones is returned to the reservoir.

Preferably this process is carried out in the apparatus of the invention which comprises an absorption column having an inlet for the gas mixture and the absorbent and an outlet for the depleted gas and the used absorbent. The inlet of the absorption column is provided with a connecting mixing chamber which has an inlet connected to the source of the gas mixture, an inlet for the liquid absorbent, means for accelerating the liquid absorbent through the mixing chamber at a speed sufficient to entrain and to mix the gas mixture with the liquid absorbent in the chamber and means for delivering the resultant mixture of liquid absorbent and gas mixture into the absorption column. A stripping column is provided in the apparatus of this invention which also has an inlet for the liquid absorbent and the stripping gas and an outlet for the regenerated absorbent and the impregnated stripping gas. The inlet of the stripping column is similarly connected to a mixing chamber which has an inlet for the stripping gas, an inlet for the absorbent, means for accelerating the absorbent through the mixing chamber at a speed sufficient to entrain the stripping gas from its source and to mix therewith in the chamber and means for delivering the resultant mixture of gas and liquid to the stripping zone. The apparatus has a storage tank for the liquid absorbent and means for withdrawing the absorbent therefrom, and dividing and feeding it to the inlets for the absorbent of the mixing chambers at a predetermined pressure. There also are means for removing the depleted gas from the outlet of the absorption column, means for removing the impregnated stripping gas from the outlet of the stripping column means for returning the absorbent from the outlet of the absorption column to the storage tank and means for returning the absorbent from the outlet of the stripping column to the storage tank.

This invention is based on the discovery that it is possible to use just one pumping means to convey the absorbent, fluid mixture, and stripping gas throughout the system. As will be explained in detail thereinafter, this invention has for the first time recognized the possibility that one pumping means is sufficient to circulate the absorbent simultaneously through the absorption column and the stripping column by transferring the kinetic energies of the accelerated absorbent to the static or slow moving gas for entraining and mixing the gas and liquid phases in the columns and still maintain the same efficient as if multiple pumps and/or fans were used as shown in the prior art. This realization implies an important simplification to the practical construction of the associated apparatus, since it is now necessary to monitor only one pump.

This discovery and invention can be applied to a wide range of absorption problems in chemical engineering. For example, one application of this invention is in the washing of carbon dioxide out of a gas mixture, such as those from a fruit storage room. In these examples, potash can be used as the absorbent and fresh air as the stripping gas. Further to illustrate the invention, the above stated example and specific embodiments will be described herein below with reference to the accompanying drawings therein.

Figure 2:
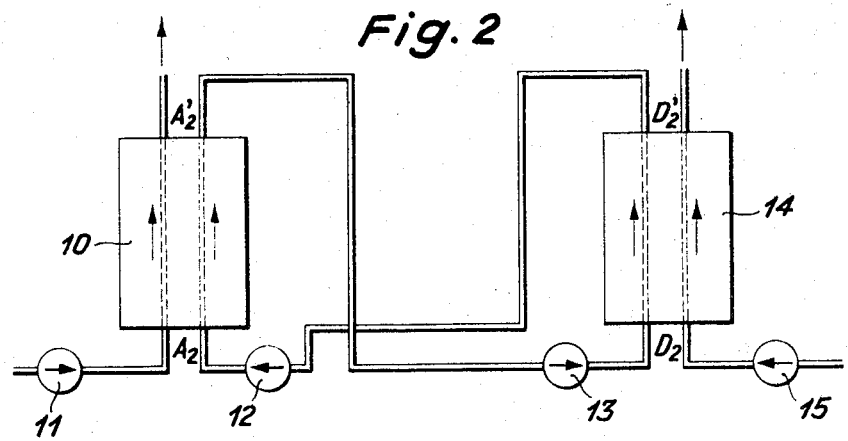
Figure 3:
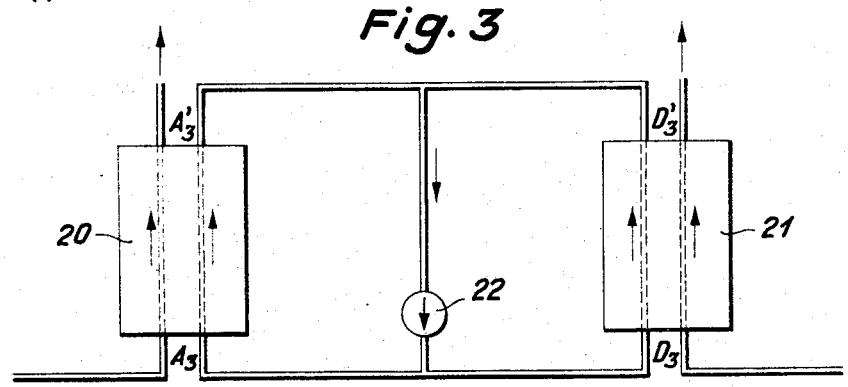

FIGS. 1 and 2 are schematic diagrams of a plant for a counter-current process according to the prior art, FIG. 3 is a schematic diagram for a plant according to the invention, FIGS. 1a, 2a, and 3a are corresponding characteristic graphs of the three processes shown in FIGS. 1 and 3 for the specific example of washing $CO_2$ out of a gas mixture containing 5% by volume of $CO_2$ using a one normal aqueous potash solution.

Figure 4A:
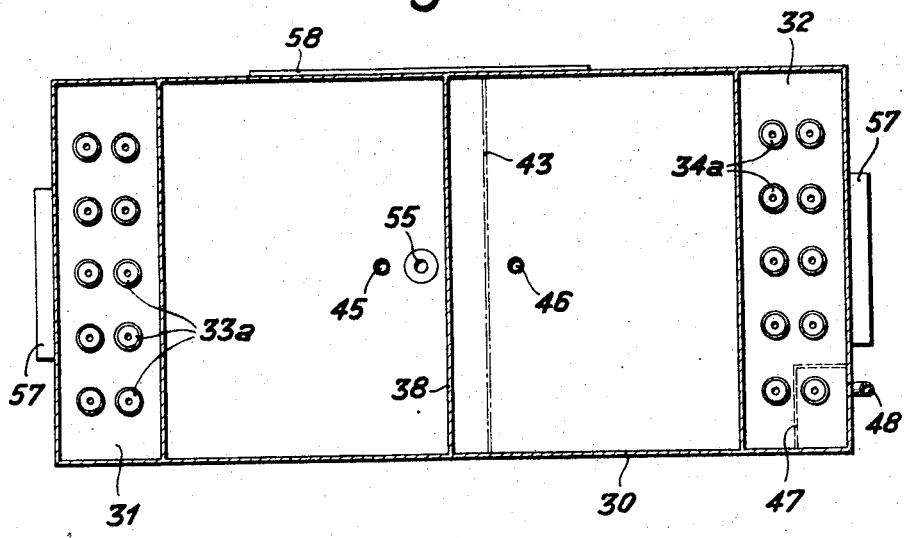

FIG. 4 is a section of an apparatus of a preferred embodiment of this invention, and FIG. 4a is a cross section through the apparatus along line IV—IV.

Referring initially to FIG. 1, which shows a counter-current plant of the prior art, a gas mixture, enriched with carbon dioxide is delivered by a fan 1 and passes through an absorption column 2, which may be a packed tower. In the absorption column the carbon dioxide is washed out in a potash solution used as an absorbent. The impregnated absorbent, charged with carbon dioxide is delivered by a pump 3 from the absorption tower 2 to a stripping tower 4, in which the carbon dioxide is stripped from the absorbent by a stream of air delivered by fan 6. The regenerated absorbent is then returned to tower 2 by a pump 5.

FIG. 2 shows a parallel-flow plant of the prior art, in which both the gas mixture and the absorbent are fed to the bottom of the absorption tower 10. A fan 11 and a pump 12 are used to produce the required delivery pressure. The charged absorbent then flows in one circuit and is delivered by a pump 13 to a stripping tower 14. The absorbent flows through the stripping tower 14 in the same direction as the stripping gas, which is introduced into the tower by means of a fan 15.

FIG. 3 shows a plant for performing the process according to the invention. The gas mixture, the stripping gas and the absorbent flow through the absorption tower 20 and the stripping tower 21 respectively in the same direction. The only driven delivery element is a pump 22 disposed in the flow of absorbent. This pump advantageously draws in equal quantities of both charged absorbent from the top of the absorption tower 20 and regenerated absorbent from the top of the stripping tower 21 and brings the mixture to the required delivery pressure for introduction to the absorption and stripping towers respectively. Delivery nozzles (not shown) which may be in the form of an ejector nozzle, are disposed at the entrance of the towers. The absorbent flows through these nozzles and acts as a propellant for the gas mixture and stripping gas so that they are respectively entrained into the absorption and the stripping towers.

In the specific example, an aqueous potash solution having a concentration of 1 N is used to wash an air mixture containing 5% by volume of carbon dioxide measured 100 cubic meters at standard temperature and pressure (100 Nm.³). 2% by volume of carbon dioxide are to be removed by the washing operation. The absorbent is regenerated by means of fresh air. An important factor in the design of an absorption plant is the amount of absorbent (L) required to produce the desired result. This amount can be found for each system shown in FIGS. 1–3 with the aid of the graphs in FIGS. 1a–3a.

In the graph the X denotes the carbon dioxide content in the absorbent and Y denotes the carbon dioxide content in the gas phase. When considering the absorption curves $a_1$, $a_2$, and $a_3$, the Y-axis is the mole fraction of $CO_2$ in the gas mixture, expressed as the ratio of the partial pressure of $CO_2$ to the total pressure of the gas mixture ($P_{CO_2}/P_{tot}$).

When considering the stripping curves $d_1$, $d_2$, $d_3$, the Y-axis represents the mole fraction of $CO_2$ in stripping gas and is similarly expressed as a ratio of the partial pressure of the soluble gas component ($P_{CO_2}$) to the total pressure of the stripping gas ($P_{tot}$).

In all the graphs the curve "$g$" represents the equilibrium points at which there will be no absorption or stripping at a temperature of about 40° C.

In this example, since the rate of flow (G) of the gaseous mixture containing carbon dioxide is 100 Nm.³/h. (h. is time in hour) and there is to be a volumetric reduction of carbon dioxide ($\Delta Y$) from 5% to 3%, then the amount of carbon dioxide to be absorbed per unit time (M) is 2 Nm.³/h.

Remembering the Y indicates the carbon dioxide content in the gas phase, X the carbon dioxide content in the absorbent, the subscripts I and II relate to conditions at the gas entry and exit side respectively, and the plus and minus sign apply to counter-current and parallel flow respectively, then it follows that:

$$M = G(Y_I - Y_{II}) = \pm L(X_I - X_{II})$$

This material balance equation can be used to plot the characteristic graphs of FIGS. 1a–3a showing the relationship between the compositions of the two phases in each intermediate stage of the absorption and stripping respectively. The operation lines are straight lines which in the case of the absorption processes in FIGS. 1a to 3a pass through the points $A_1$ and $A_1'$, $A_2$ and $A_2'$, $A_3$ and $A_3'$, and, in the case of the stripping processes, through the points $D_1$ and $D_1'$ and $D_2$ and $D_2'$, and $D_3$ and $D_3'$. For the sake of clarity, these points are also shown in FIGS. 1 to 3 to indicate the compositions of the phases at the tower entry and exit sides. Of course, the operating lines for the absorption processes are always situated above the equilibrium curve since the partial pressure of the carbon dioxide in the gas mixture must be high enough to require that the carbon dioxide transfer to the absorbent; similarly the operating lines for the stripping processes are always situated beneath that curve.

The required amount L of circulating absorbent for the three systems can be determined from the above equation for given initial and final compositions of the two phases.

In the example illustrated, $M=2$ Nm.³/h., $G=100$ Nm.³/h. and $\Delta Y=0.02$.

In FIG. 1a for the counter-current process, the $\Delta X$ is 1.48. If this value is introduced into the material balance equation the quantity of absorbent is found to be $L=1.35$ m.³/h. This relatively small quantity of absorbent will, however, requiring columns, which may be packed towers, of a considerable height since good mass transfer requires large contact surface area, hence large volume.

For the method as shown in FIG. 2, with M, G and $\Delta Y$ the same as above, $\Delta X$ will be .05 as shown by the associated graph in FIG. 2a. The L is calculated to be 40 m.³/h.

The minimum quantity of absorbent, which requires a maximum efficiency for the absorption plant, can be calculated with the aid of the associated maximum $\Delta X$ read from FIG. 2a. The value of the associated $X_{max}$ can be determined by making a connection between point $A_2$ and the point of intersection of the equilibrium curve and a horizontal line passing through the ordinate 0.03; and making a connection between point $D_2$ and the point of intersection of the equilibrium curve and a horizontal line passing through the ordinate .02. In the example illustrated $X_{max}=0.8$ and $L_{min}$, therefore, is 2.5 m.³/h.

If the values $M=2$Nm.³/h. and $\Delta Y=.02$ are used in this invention as they were in the previous examples, then FIG. 3a gives $\Delta X_3=.1$, which is two times the value of $\Delta X_2$. In view of the fact that the absorbent flows in two circuits according to the invention, such circuits being interconnected by a common pump, L can be calculated from the material balance equation which is equal to 40 m.³/h., similar to the parallel flow process.

It will therefore be apparent that with the invention there is no need to increase the quantity of absorbent required in the parallel flow process which employ a plant with two fans and two pumps. In other words the same absorption effect can be obtained with the same quantity. However, the invention has the important advantage that only one pump is required in the complete plant.

Although the process according to the invention has been explained with reference to a specific example, the invention can, as already stated, be applied generally to cases in which the characteristic graphs and equilibrium curves are similar to those in the exemplified embodiment.

According to the invention both the absorption apparatus and the stripping apparatus use delivery nozzles through which the absorbent flows as a propellant for the gas mixture and stripping gas respectively, and the volume of liquid flowing through the nozzles must at least be of the order of one-sixth, advantageously about one-third to one-half, of the gas volume drawn in. This ratio of the liquid volume to the gas volume in the towers is itself necessary to produce an effective bubble bed essential to good mass transfer. The quantity of absorbent used is preferably equal to a multiple of the theoretical minimum quantity of absorbent. The new principle on which the invention is based is that the absorption and the stripping processes can be carried out as proposed by the invention without any appreciable deterioration of the energy consumption.

FIGS. 4 and 4a show a preferred embodiment of an apparatus for performing the process according to the invention. An absorption column 31 and a stripping column 32 are disposed in a closed shell 30. The latter may be made of steel. The bottom of each column is divided into two separate chambers 33 and 33b for columns 31 and 34 and 34b for column 32. There are ten ejector nozzles 33a and 34a respectively positioned in the bottom of the columns. The converging sections are positioned in the middle separating the upper chambers 33 and 34 from the lower chambers 33b and 34b for columns 31 and 32 respectively. The diverging sections of the nozzles 33a and 34a extend from chambers 33 and 34 to the columns. A feed pipe 35 for the gas mixture connects to chamber 33b of the absorption column and a feed pipe 36 for the stripping gas connects to chamber 34b for the stripping column. The columns are at least partly surrounded by an absorbent tank 37. This tank communicates with the top ends of the towers via a gas chamber. The gas chamber is divided into portions by a partition 38 extending into the absorbent. The portions are a chamber 39 associated with the absorption column 31 and a chamber 40 associated with the stripping column 32. A gas mixture discharge pipe 41 is connected to the top of the gas chamber 39 and a stripping gas discharge pipe 42 is connected to the chamber 40. In the gas chamber on the stripping side the partition has a continuous collector gutter 43 for foam, this gutter terminating at the tank side walls. A drain aperture 44 is provided in one wall of the tank in the cross-section of said gutter.

A gas mixture feed pipe 45 is connected to chamber 33 of the absorption tower and a stripping gas feed pipe 46 is connected to chamber 34 of the stripping tower. In the region of at least one of the nozzles the chamber 34 is separated from the rest of the nozzles by a partition 47 so as to be gas-tight. A feed-pipe 48 for the supply of concentrated absorbent, for example on starting up, leads into this part of the chamber. A feed pipe 50 to make up losses, mainly evaporation losses, from the absorbent chamber, also leads into the absorbent chamber 32. A flow of water, for example, may enter pipe 50 and be controlled by a valve 52 actuated by a float 51. A pump 54, for example a centrifugal pump, together with its drive motor, is disposed in the cavity 53 bounded by the tank walls on three sides and the walls of the absorption and stripping tower at the top, and by the liquid tank 37. This pump communicates with the liquid tank via a suction pipe 55 and its delivery pipe 56 branches into the branch pipes 35 and 36. At two side walls the cavity 53 has ventilating slits 57 and is accessible from outside by means of a detachable cover 58 disposed in one of the side walls.

Before the actual process begins, water is introduced into the liquid chamber 37 via pipe 50. With the pump running, concentrated potash solution (for example 4 N solution) is drawn into the apparatus through pipe 48. The amount of water being introduced into the liquid chamber being such, for example, that a 1 N potash solution is obtained at the end of the filling operation. During the process, the gas mixture, in the example 100 Nm.³ per hour of air enriched with carbon dioxide, is entrained through the pipe 45 into chamber 33. The absorbent pumping into chambers 33b and 34b of the respective columns passes through the converging-diverging sections of the nozzles 33a and 34a reaching critical velocity at the narrowest part of the nozzles. The high velocity and low static pressure of the absorbent entrains the corresponding gaseous mixtures fed into chambers 33 and 34. In the diverging or the diffuser sections of the nozzles the two fluids, absorbent and gaseous mixtures, mix. The high velocity fluid losing momentum to the low velocity fluid. Under this condition, kinetic energy of the mixed stream is converted to pressure energy and the mixtures are discharged into the respective columns.

The discharge of the mixtures from a column of liquid interspersed by gas bubbles; the soluble gas component, carbon dioxide in this example, being transferred into the absorbent. The gas mixture, whose carbon dioxide contents has been reduced from 5% to 3% by volume, for example, during absorption, flows back through the discharge pipe 41, to a storage chamber. The absorbent, enriched in carbon dioxide, flows off into the liquid tank 37 and is sucked in again therefrom by the pump 54. Absorbent regenerated in the stripping tower 32 is also entrained from this liquid chamber. This mixture is uniformly distributed by the pump, simultaneously driven through the nozzles of the double bottom of the absorption tower and through the nozzles in the double bottom of the stripping tower. Strippings, which may be fresh air, is jointly entrained through the feed pipe 46 and is delivered into the reaction chamber of the double bottom column above the nozzles. As in the case of the absorption column, a column of liquid interspersed by gas bubbles forms therein, carbon dioxide being transferred from the absorbent to the stripping gas. The stripping gas charged with carbon dioxide leaves the tank through pipe 42 while the regenerated absorbent flows away into the liquid chamber 37.

Foam collecting in the gutter and possibly containing solid impurities, for example, flows out of the tank through the aperture 44.

The absorption and stripping processes take place at approximately the same pressure and temperature. While the pressure in the bubble towers in the example illustrated is somewhat above 1 atmosphere, the delivery pressure of the pump is approximately 2 atmospheres. The absorbent has approximately the same temperature of about 30–40° C. throughout the apparatus, the temperature increase over ambient temperature being produced mainly by the pumping energy.

When the invention is applied to the washing of carbon dioxide out of the air in a storage chamber for fruit and the like, the tank may advantageously be disposed in the storage chamber.

I claim:
1. An apparatus for the separation of at least one gas component from a gas mixture using a liquid absorbent to absorb said gas component in an absorption operation and a stripping gas to remove the absorbed gas component from the liquid absorbent in a stripping operation, said apparatus comprising:
   (a) an absorption column having an inlet for said gas mixture and said absorbent and an outlet for the depleted gas and the used absorbent,
   (b) a first mixing chamber connected to the inlet of said absorption column, said chamber having an inlet connected to the source of said gas mixture, an inlet for said liquid absorbent, means for accelerating said liquid absorbent to a speed sufficient to entrain and to mix said gas mixture in said chamber and means for delivering the resultant mixture of liquid absorbent and gas mixture into said absorption column,
   (c) a stripping column having an inlet for the liquid absorbent and the stripping gas and an outlet for the regenerated absorbent and the impregnated stripping gas,
   (d) a second mixing chamber connected to the inlet of said stripping column, said second mixing chamber having an inlet connected to the source of said stripping gas, an inlet for said liquid absorbent, means for accelerating said liquid absorbent to a speed sufficient to entrain and to mix said stripping gas and means for delivering the resultant mixture of liquid absorbent and stripping gas into said stripping column,
   (e) a storage tank for said liquid absorbent,
   (f) means for withdrawing the liquid absorbent from said storage tank and dividing and feeding said absorbent to the inlets for the absorbent of said first and second mixing chambers at a predetermined pressure,
   (g) means for removing the depleted gas from the outlet of said absorption column,
   (h) means for removing the impregnated stripping column,
   (i) means for returning the absorbent from the outlet of the absorption column to said storage tank, and
   (j) means for returning the absorbent from the outlet of the stripping column to said storage tank.

2. The apparatus of claim 1 wherein said second mixing chamber has an additional inlet connected to the source of fresh liquid absorbent, means for accelerating the liquid absorbent from the storage tank to a speed sufficient to entrain and to mix said fresh liquid absorbent in said chamber, and means for delivering the resultant liquid absorbent to said stripping column.

3. An apparatus for the separation of at least one gas component from a gas mixture using a liquid absorbent to absorb said gas component in an absorption operation and a stripping gas to remove the absorbed gas component from the liquid absorbent in a stripping operation, said apparatus comprising:
   (a) a storage tank for the liquid absorbent having an outlet for the removal of its liquid content and an open top for the removal of gas,
   (b) an outer shell extending above and enclosing said tank and having at least a portion of its peripheral walls spaced apart from the side walls of said tank and forming an absorption column and a stripping column adjacent to said tank, said outer shell having a partition extending across its width and downward from its top to at least below the liquid level of said tank to divide the enclosed air space into two separate air chambers with one communicating with said absorption column and the other communicating with said stripping column, said outer shell having outlets in each of said air chambers to facilitate the removal of gases from said chambers,
   (c) said absorption and stripping columns each having at its bottom a mixing chamber, the mixing chamber for said absorption column having an inlet connected to the source of said gas mixture and the mixing chamber for said stripping column having an inlet connected to the source of said stripping gas, each of said chambers having an inlet for the liquid absorbent and a plurality of nozzles disposed therein for accelerating the liquid absorbent through the chamber to entrain and to mix the respective gases with the liquid absorbent and to direct the resultant mixture into its respective one of said absorption and stripping columns, and
   (d) a pump having its intake end connected to the outlet of said storage tank and its output end connected to the absorbent inlets of said mixing chambers for delivering the absorbent to the mixing chambers at a predetermined pressure.

4. The apparatus of claim 3 wherein said mixing chamber for the stripping column has at least one nozzle located in an isolated chamber adjacent to the other nozzles of said mixing chamber and said isolated chamber has an outlet connected to a source of fresh absorbent whereby the injection of the liquid absorbent from the pump through said one nozzle effectively entrains a portion of said fresh absorbent into the stripping column.

5. The apparatus of claim 3 wherein said storage tank has an inlet connected to the source of fresh liquid absorbent and said inlet is controlled by the liquid level of the tank.

References Cited
UNITED STATES PATENTS

| | | | |
|---|---|---|---|
| 1,717,761 | 6/1929 | Claude | 23—2 |
| 2,649,166 | 8/1953 | Porter et al. | 55—68 |
| 2,990,910 | 7/1961 | Kimmell | 55—32 |
| 3,064,952 | 11/1962 | Brown | 55—32 |

REUBEN FRIEDMAN, *Primary Examiner.*

SAMIH N. ZAHARNA, C. N. HART, *Examiners.*